(12) United States Patent
Sivertsen et al.

(10) Patent No.: US 9,851,801 B1
(45) Date of Patent: Dec. 26, 2017

(54) DUAL TOUCHPAD SYSTEM

(71) Applicant: American Megatrends, Inc., Norcross, GA (US)

(72) Inventors: Clas G. Sivertsen, Lilburn, GA (US); Faycal Guennar, Taipei (TW)

(73) Assignee: American Megatrends, Inc., Norcross, GA (US)

( * ) Notice: Subject to any disclaimer, the term of this patent is extended or adjusted under 35 U.S.C. 154(b) by 406 days.

(21) Appl. No.: 13/708,779

(22) Filed: Dec. 7, 2012

(51) Int. Cl.
  *G09G 1/00* (2006.01)
  *G06F 3/01* (2006.01)
(52) U.S. Cl.
  CPC ..................... *G06F 3/017* (2013.01)
(58) Field of Classification Search
  CPC .......... G06F 3/0213; G06F 1/00; G06F 3/017; G06F 3/013; G06F 3/04883; G06F 3/041; G06F 3/044
  USPC .......................................... 345/158, 173–179
  See application file for complete search history.

(56) References Cited

U.S. PATENT DOCUMENTS

| | | | |
|---|---|---|---|
| 2007/0013674 A1 | 1/2007 | Woolley | |
| 2007/0057922 A1* | 3/2007 | Schultz et al. | 345/173 |
| 2007/0075983 A1 | 4/2007 | Chiu et al. | |
| 2007/0242056 A1* | 10/2007 | Engelhardt | G06F 3/0416 345/173 |
| 2009/0213081 A1* | 8/2009 | Case, Jr. | 345/173 |
| 2010/0095240 A1* | 4/2010 | Shiplacoff et al. | 715/784 |
| 2010/0328206 A1* | 12/2010 | Morin et al. | 345/157 |
| 2012/0032894 A1* | 2/2012 | Parivar et al. | 345/173 |

OTHER PUBLICATIONS

Apple (Magic Trackpad by apple, and its user's guide is attached in the office action as Magic_Trackpad_UG.pdf, with copyright dated 2010).*
Superuser (From URL: http://superuser.com/questions/439642/two-mice-one-left-handed-and-another-right-handed-at-the-same-time, dated on Jun. 2012, attached as Superuser.pdf).*
"CEATAC 2008: Panasonic's futuristic OSD/touchpad remote control (video)" [online][retrieved on Nov. 3, 2012] retrieved from: http://techcrunch.com/2008/10/02/ceatac-2008-panasonics-futuristic-osdtuchpad-remote-control-video/ , 1 page.

* cited by examiner

*Primary Examiner* — Michael Faragalla
(74) *Attorney, Agent, or Firm* — Newport IP, LLC; Leonard J. Hope

(57) ABSTRACT

A dual touchpad system is provided. The dual touchpad system includes a first touchpad and a second touchpad. The dual touchpad system also includes an input detection unit coupled to the first and second touchpads and configured to monitor the first and second touchpads for user contact thereon. The dual touchpad system also includes a gesture recognition unit configured to control an electronic device in response to receiving input from the input detection unit indicative of detected contact on the first and/or second touchpads to control the electronic device. The first touchpad is spaced apart from and is non-concentric with the second touchpad in embodiments.

12 Claims, 5 Drawing Sheets

DUAL TOUCHPAD SYSTEM

BACKGROUND

Touchpads are commonly found in laptop computers and other electronic devices. When included as part of a laptop computer, the touchpad is typically used as a pointing device in place of, or in combination with, a mouse. A typical touchpad includes a detection surface and an input detection device. The input detection device detects contact on the detection surface. With some conventional touchpads, the input detection device is able to perform such detection with respect to single contacts performed using a single finger (or object, such as a stylus), or with respect to multiple simultaneous contacts performed using two or more fingers or objects.

A conventional touchpad allows for only limited control of the laptop or other type of electronic device with which it associated. For example, zoom-in and zoom-out control is not supported with conventional touchpads. Moreover, a conventional touchpad must include buttons to allow for full functionality, and this combined use of the touchpad and buttons is challenging for many users, particularly in view of the fact that two hands must be used and the commonly close proximity between the touchpad and the buttons.

It is with respect to these and other considerations that the disclosure presented herein has been made.

SUMMARY

The embodiments presented herein provide a dual touchpad system and a method for controlling an electronic device using the dual touchpad system. Through the use of the dual touchpad system, new possibilities for interacting with an electronic device, such as a laptop computer, are made available. Some of these possibilities might improve on previous touchpad systems.

A dual touchpad system is provided according to one aspect disclosed herein. In one embodiment, the dual touchpad system includes two touchpads, referred to herein as a "first" touchpad and a "second" touchpad. As discussed briefly above, a typical touchpad includes a detection surface and an input detection device. The input detection device detects contact on the detection surface. The first touchpad may be spaced apart from and may be non-concentric with the second touchpad.

The dual touchpad system provided herein also includes an input detection unit coupled to the first and second touchpads in one embodiment. The input detection unit is configured to monitor the first and second touchpads for user contact thereon. In response to detecting contact to either the first touchpad or the second touchpad, the input detection unit provides a pointer detection signal describing the detected contact to a gesture recognition unit. The gesture recognition unit is configured in one embodiment to control an electronic device associated with the dual touchpad system, such as a laptop computer, in response to receiving input from the input detection unit indicative of user contact on the first and/or second touchpads to control the electronic device.

In some embodiments, the dual touchpad system also includes functionality for changing the mode of operation of the dual touchpads based upon gestures input by a user. For instance, in one embodiment, a user might be permitted to use the first touchpad to move an on-screen cursor and use the second touchpad for scrolling. In response to detecting a certain gesture on one of the touchpads, the dual touchpad system might configure the other touchpad to switch to a different mode of operation. For instance, in the example given above, a gesture might be provided to switch the second touchpad to a mode of operation in which detected input is provided to the controlled electronic device in the form of arrow keys.

In order to provide the functionality for controlling an electronic device using a dual touchpad system described above, a first pointer detection signal is generated in response to user contact and any movement (or break in movement) on either or both a first touchpad and a second touchpad in a dual touchpad system. In response to detecting the first pointer detection signal, a determination is made as to whether the first pointer detection signal corresponds to a gesture made on either the first touchpad or the second touchpad to change a mode of operation of the other of the first touchpad or the second touchpad. The mode of operation of one of the touchpads may then be changed in the manner described above if the pointer detection signal does correspond to a gesture for changing the mode of the other of the first touchpad or the second touchpad with reference to the gesture corresponding to the first pointer detection signal.

The subject matter described herein might also be implemented as a computer-implemented method, in a computing system, as an apparatus, or as an article of manufacture such as a computer-readable storage medium. These and various other features as well as advantages will be apparent from a reading of the following detailed description and a review of the associated drawings.

DETAILED DESCRIPTION

Figure 1:
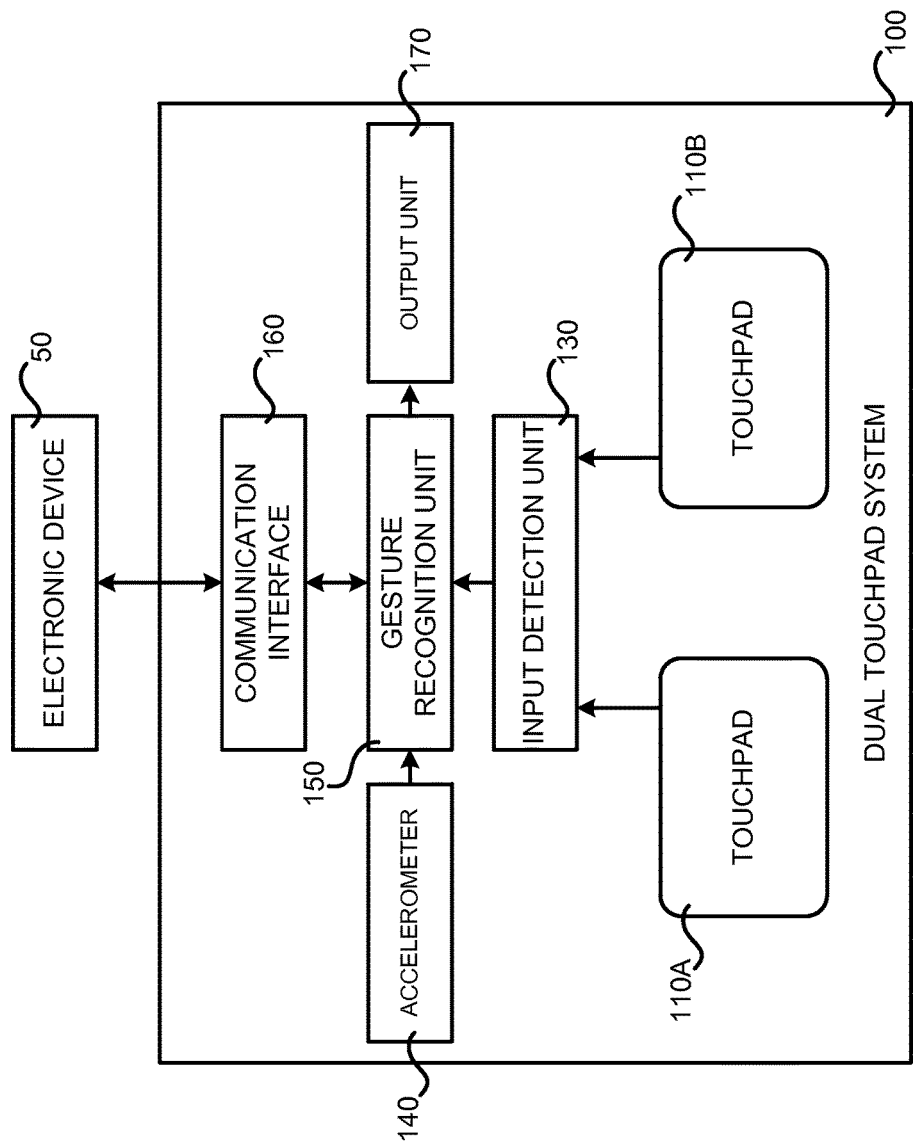
FIG. 1 is block diagram showing one illustrative configuration for a dual touchpad system, according to one embodiment presented herein.

In the following detailed description, references are made to the accompanying drawings that form a part hereof, and in which are shown by way of illustration specific embodiments or examples. Referring now to the drawings, in which like numerals represent like elements through the several figures, aspects of a dual touchpad system will be described.

Referring now to FIG. 1, a block diagram will be described that illustrates a dual touchpad system configured according to one embodiment disclosed herein. The dual touchpad system 100 shown in FIG. 1 may be coupled to an electronic device 50 and utilized to control aspects of the operation of the electronic device 50. For instance, the dual touchpad system 100 might provide input to the electronic device 50 for controlling the movement of a mouse cursor, for inputting keystrokes, for inputting gestures, and, potentially for performing other types of tasks.

In one implementation, the dual touchpad system 100 includes first and second touchpads 110A and 110B. Each of the first and second touchpads 110A and 110B, respectively, may include a touch-sensitive surface. The touch-sensitive surface may be based on any one of capacitive, resistive, infrared, and surface acoustic wave technologies. Other technologies for detecting touch and generating an electrical signal describing the detected touch might also be utilized.

In one implementation, the dual touchpad system 100 also includes an input detection unit 130, an accelerometer 140, a gesture recognition unit 150, and a communication interface 160. Each of these components and various aspects of their configuration and operation will be described in detail below.

The input detection unit 130 is coupled to the first and second touchpads 110A and 110B. The input detection unit 130 detects contact on the first and second touchpads 110A and 110B and any movement or breakage in the contact. The input detection unit 130 might also detect speed (magnitude), velocity (both magnitude and direction), and acceleration (a change in magnitude and/or direction) of the contact on the first and second touchpads 110A and 110B. The input detection unit 130 might be configured to perform such detection with respect to single contacts performed using a single finger (or object, such as a stylus), or with respect to multiple simultaneous contacts performed using two or more fingers or objects. The input detection unit 130 outputs corresponding pointer detection signals based upon the detected contact with the touchpads 110A and 110B.

In some embodiments, the first and second touchpads 110A and 110B include a proximity-sensitive surface. The proximity-sensitive surface may be based on any one of inductive, capacitive, capacitive displacement, optical shadow, eddy-current, magnetic, photocell, laser rangefinder, sonar, and radar technologies. Other technologies might also be utilized. In these embodiments, the input detection unit 130 detects the presence of a target (e.g., a finger of a user or an object being held by the user) in proximity to the first and second touchpads 110A and 110B and any movement or breakage in movement of the contact (i.e., the target is no longer close enough to be sensed). The input detection unit 130 might also detect speed, velocity, and acceleration of the target that is in proximity to the first and second touchpads 110A and 110B.

In some embodiments, the input detection unit 130 might also detect different proximities of the target to the first and second touchpads 110A and 110B. In embodiments where the first and second touchpads 110A and 110B comprise proximity-sensitive surfaces, the input detection unit 130 might be configured to perform such detection with respect to a single target in proximity to the first and second touchpads 110A and 110B, in which the single target may be a single finger or object, or with respect to multiple simultaneous targets in proximity to the first and second touchpads 110A and 110B, in which the multiple targets may be two or more fingers or objects. The input detection unit 130 outputs corresponding pointer detection signals for the detected targets. The pointer detection signals might then be passed directly to the electronic device 50 for controlling aspects of the operation of the electronic device, such as for controlling the movement of a mouse cursor for instance.

In some implementations, an accelerometer 140 is provided in the dual touchpad system 100 that measures the acceleration of the dual touchpad system 100 and outputs corresponding acceleration signals. The accelerometer 140 may be a single- or multi-axis accelerometer. In some embodiments, the accelerometer 140 outputs the acceleration signals to a gesture recognition unit 150.

The gesture recognition unit 150 is electrically coupled to the input detection unit 130 and receives the pointer detection signals output thereby. In some embodiments, the gesture recognition unit 150 is also electrically coupled to the accelerometer 140 and receives the acceleration signals output thereby.

The gesture recognition unit 150 receives the pointer detection signals from the input detection unit 130. In response to receiving the pointer detection signals, the input detection unit 130 determines whether the pointer detection signals correspond to a gesture in some embodiments. A gesture is movement that corresponds to a command.

If the pointer detection signals do correspond to one or more gestures, the gesture recognition unit 150 generates control signals corresponding to the identified gesture, or gestures, and outputs the control signals to the electronic device 50. The electronic device 50 may then receive the control signals and perform one or more commands corresponding to the gestures. In some embodiments, the gesture recognition unit 150 takes no further action if it determines that the pointer detection signals do not correspond to any gesture to control the electronic device 50. In other embodiments, however, an error message is output to a user of the dual touchpad system if the gesture recognition unit 150 determines that the pointer detection signals do not correspond to a gesture for controlling the electronic device 50.

In some embodiments, the gesture recognition unit 150 also determines whether received pointer detection signals correspond to gestures for changing the mode of operation of either or both of the first and second touchpads 110A and 110B. In this regard, certain gestures might be defined which, if input by a user of the dual touchpad system 100, change the manner of operation of one or both of the touchpads 110A and 110B. If a gesture defined to change the mode of operation of either or both of the touchpads 110A and 110B is detected, the gesture recognition unit 150 will generate a control signal for instructing the electronic device 50 to change the mode of operation for the touchpad and output the generated control signal to the electronic device 50.

In one specific example, a gesture might be made on the touchpad 110A corresponding to a command to change the mode of operation of the touchpad 110B. In another example, a gesture might be made on the touchpad 110B corresponding to a command to change the mode of operation of the touchpad 110A. Similarly, a gesture might be made on the touchpad 110A corresponding to a command to change the mode of operation of the touchpad 110A and a gesture might be made on the touchpad 110B corresponding to a command to change the mode of operation of the touchpad 110B. In response to detecting these gestures, the gesture recognition unit 150 will send an appropriate command to the electronic device 50.

As mentioned above, the gesture recognition unit 150 might also receive acceleration signals from the accelerometer 140. In response to receiving such signals, the gesture recognition unit 150 might determine whether the acceleration signals correspond a movement of the dual touchpad system 100 for changing the mode of operation of either or both of the touchpads 110A and 110B. In response to determining that the acceleration signals correspond to movement of the dual touchpad system 100 to change the mode of either or both of the first and second touchpads 110A and 110B, the gesture recognition unit 150 might then identify the gestures that received pointer detection signals correspond to on the basis of the changed mode of either or both of the first and second touchpads 110A and 110B. Thereafter, the gesture recognition unit 150 generates corresponding control signals and outputs the control signals to the electronic device 50.

In some embodiments, after receiving acceleration signals, the gesture recognition unit 150 further receives pointer detection signals from the input detection unit 130 corresponding to a designation of the mode for either or both of the first and second touchpads 110A and 110B. The gesture recognition unit 150 then subsequently identifies the gestures that the received pointer detection signals correspond to on the basis of the changed mode of either or both of the first and second touchpads 110A and 110B, generates corresponding control signals, and outputs the control signals to the electronic device 50.

In some embodiments, the gesture recognition unit 150 receives acceleration signals from the accelerometer 140, and in response to determining that the acceleration signals correspond to movement of the dual touchpad system 100 to control the electronic device 50, generates corresponding control signals, and outputs the control signals to the electronic device 50.

Figure 4A:
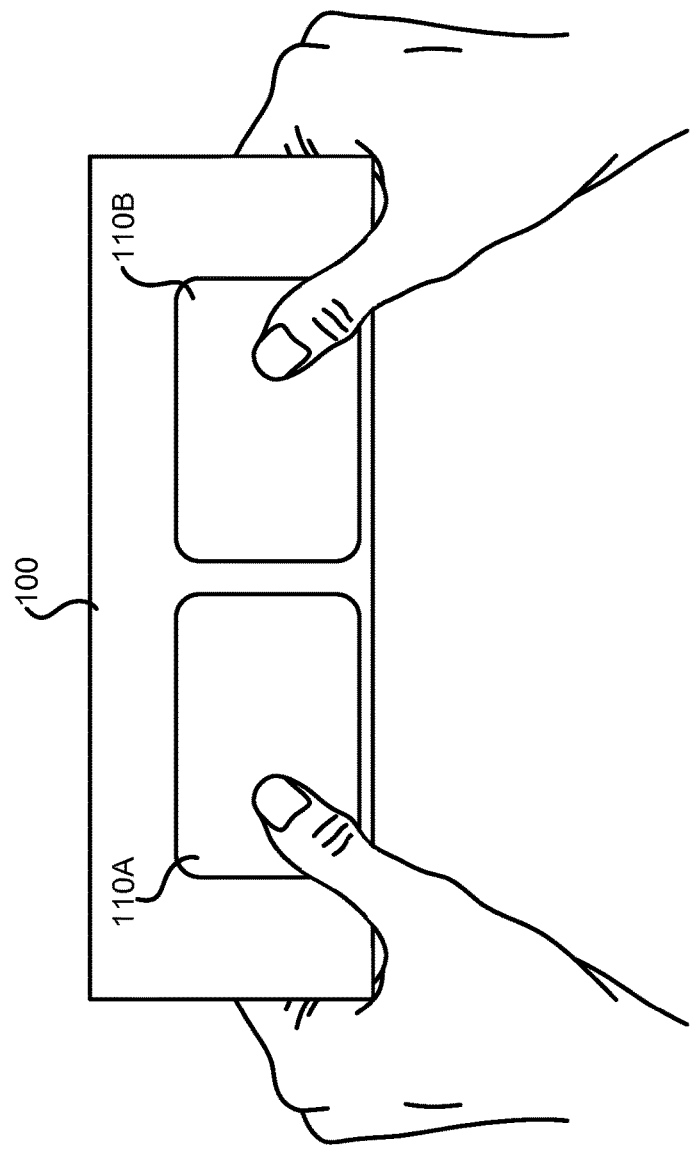
FIGS. 4A-4B are device diagrams showing several illustrative layouts for the touchpads in a dual touchpad system and their use, according to several embodiments disclosed herein.
Figure 4B:
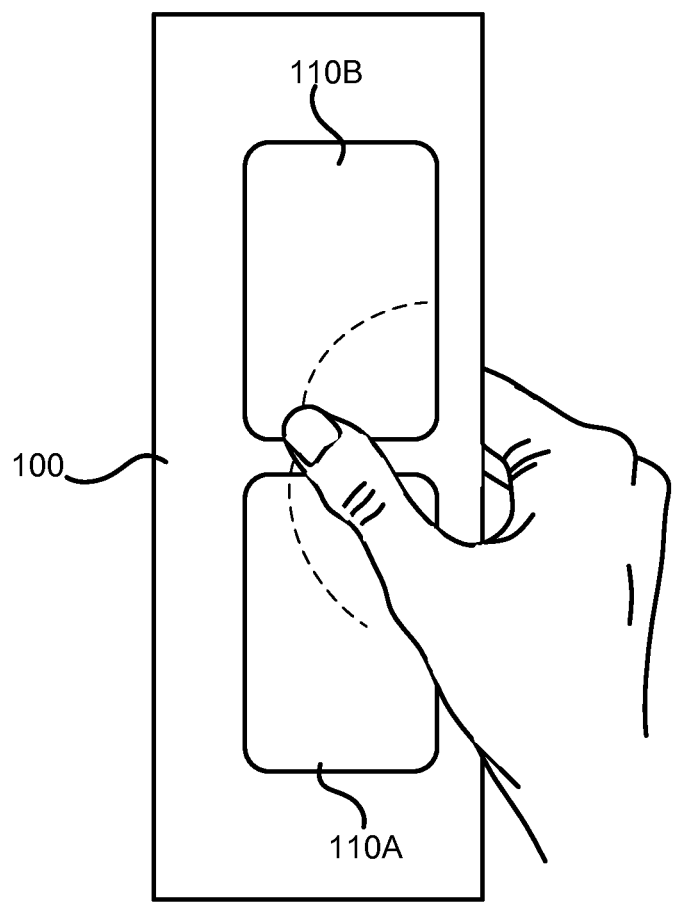

In some embodiments, the gesture recognition unit 150 receives the acceleration signals from the accelerometer 140, determines the orientation that the dual touchpad system 100 is being held, and interprets the pointer detection signals made by way of the touchpads 110A and 110B accordingly. For example, in some embodiments, the dual touchpad 100 may have a rectangular outer shape and the first and second touchpads 110A and 110B may be disposed adjacent to each other. With this arrangement, a user may hold the dual touchpad system 100 horizontally (as shown in FIG. 4A), such that the first and second touchpads 110A and 110B are adjacent to each other in a horizontal direction, or vertically (as shown in FIG. 4B), such that the first and second touchpads 110A and 110B are adjacent to each other in a vertical direction, and the gesture recognition unit 150 is able to determine the orientation of the dual touchpad system 100 from the acceleration signals. The gesture recognition unit 150 may then interpret the pointer detection signals on the basis of the determined orientation of the dual touchpad system 100. For example, the gesture recognition unit 150 may interpret a rightward horizontal swipe gesture made on the first touchpad 110A when the dual touchpad system 100 is held in a horizontal orientation as a volume up gesture, but may interpret an upward vertical swipe gesture made on the first touchpad 110A (i.e., the same gesture) when the dual touchpad system 100 is held in a vertical orientation as a change channel gesture. Hence, in some embodiments, a changed orientation of the dual touchpad system 100 results in essentially changing the mode of operation of the dual touchpad system 100.

The gesture recognition unit 150 outputs control signals generated thereby to the electronic device 50 via the communication interface 160. In some embodiments, the communication interface 160 comprises a wired interface, such as a Universal Serial Bus ("USB") port, a serial port, or a parallel port, and the gesture recognition unit 150 transmits the control signals to the electronic device 50 via the communication interface 160 and a cable. In some embodiments, the communication interface 160 comprises a wireless interface, such as a Bluetooth® interface or a radio frequency ("RF") interface, and wirelessly transmits the control signals to the electronic device 50 via the communication interface 160. Other types of wired and wireless communications interfaces might also be utilized.

In one example of a real-life application, the dual touchpad system 100 may be used as a game controller and certain movements detected on either or both of the touchpads 100A and 110B and/or the accelerometer 140 may be used to control a character or object in a video game. As another example, the dual touchpad system 100 may be used as a remote control and certain movements detected on either or both of the touchpads 100A and 110B and/or the accelerometer 140 may be used to control the electronic device 50, such as to change channels or increase the volume on the electronic device 50. As mentioned above, the orientation of the dual touchpad system 100, as determined by the accelerometer 140, might control the mode of operation of the dual touchpad system 100.

Figure 2:
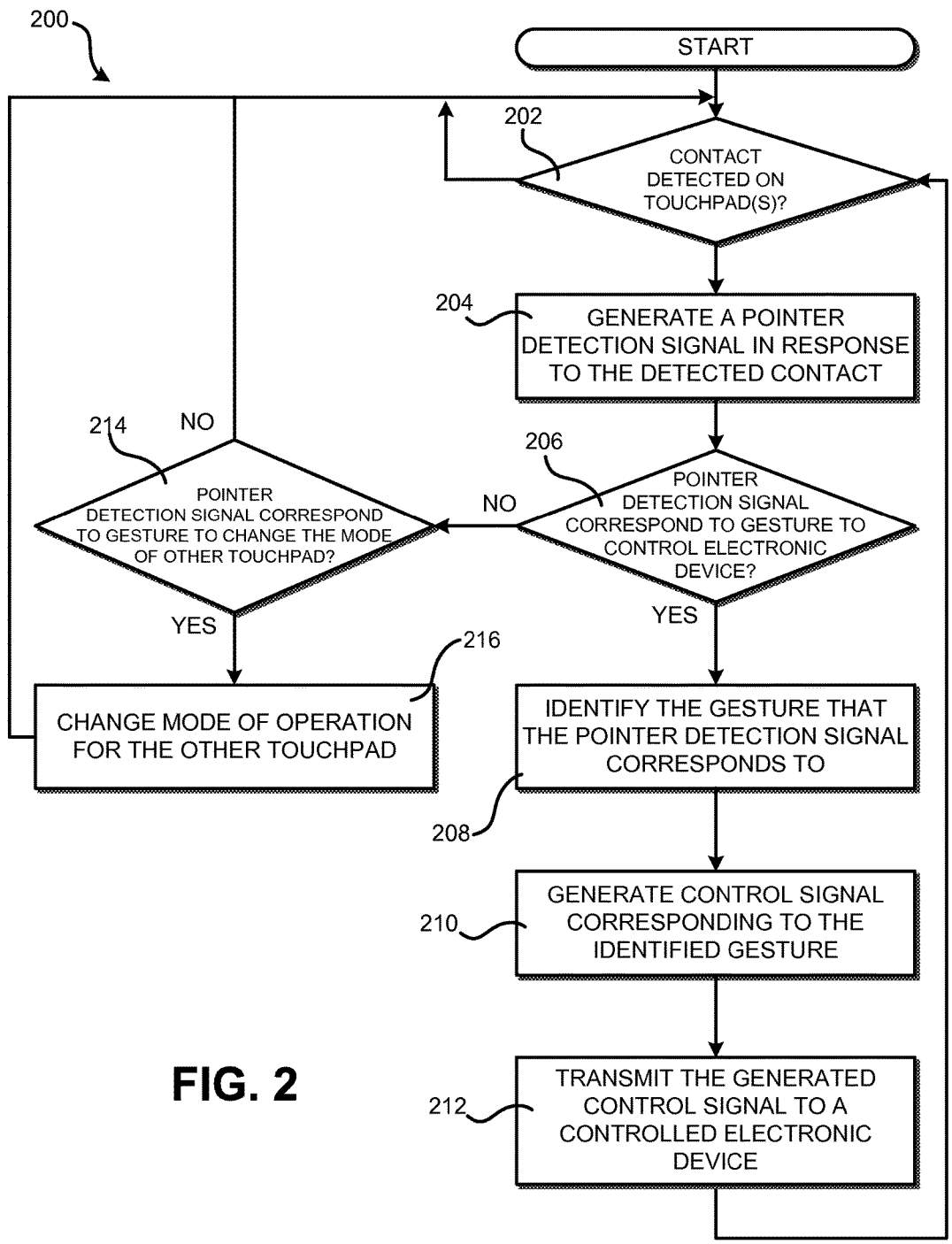
FIG. 2 is a flow diagram showing one illustrative routine for controlling the operation of an electronic device using a dual touchpad system, according to one embodiment presented herein.

Referring now to FIG. 2, a flow diagram will be described that illustrates aspects of one routine 200 for controlling an electronic device using a dual touchpad system 100, according to one embodiment disclosed herein. The logical operations of the various implementations shown in FIG. 2 and the other figures are implemented (1) as a sequence of computer implemented acts or program modules running on a computing system and/or (2) as interconnected machine logic circuits or circuit modules within the dual touchpad system 100. The implementation is a matter of choice dependent on the performance requirements of the computing system on which the embodiments described herein are implemented. Accordingly, the logical operations making up the implementations described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

In the examples described below with reference to FIGS. 2 and 3, it is assumed that the first and second touchpads 110A and 110B comprise touch-sensitive surfaces. However, it should be appreciated that the first and second touchpads 110A and 110B may comprise proximity-sensitive surfaces and other types of surfaces, as described in greater detail above.

The routine 200 begins at operation 202, where a determination is made as to whether contact has been detected on either or both of the first and second touchpads 110A and 110B. If contact has not been detected on either or both of the first and second touchpads 110A and 110B, the routine 200 proceeds back to operation 202 for another such determination. If, however, contact has been detected on either or both of the first and second touchpads 110A and 110B, the routine 200 continues from operation 202 to operation 204.

At operation 204, the input detection unit 130 generates a pointer detection signal in response to contact and any movement or breaking thereof on either or both of the first and second touchpads 110A and 110B. The input detection unit 130 transmits the pointer detection signal to the gesture recognition unit 160. The routine 200 then proceeds from operation 204 to operation 206.

At operation 206, the gesture recognition unit 150 determines whether the received pointer detection signal corresponds to a gesture to control the electronic device 50. This operation is performed since not all contact on first and second touchpads 110A and 110B corresponds to a gesture to control the electronic device 50. For example, the user may accidentally touch the first and second touchpads 110A and 110B, or may perform a gesture thereon inaccurately so that the gesture recognition unit 150 is unable to interpret the resulting pointer detection signal. The user might also perform contact on either the first or second touchpads 110A and 110B that is not a gesture, but is intended to control the operation of the electronic device 50. For instance, the user might utilize either or both of the touchpads 110A and 110B to move a mouse cursor. In this example, the pointer detection signal might be passed straight through to the electronic device 50.

If, at operation 206, the gesture recognition unit 150 determines that the pointer detection signal corresponds to a gesture to control the electronic device 50, the routine 200 continues to operation 208, where the gesture that the pointer detection signal corresponds to is identified. The routine 200 then continues from operation 208 to operation 210.

At operation 210, the gesture recognition unit 150 generates a control signal corresponding to the identified gesture. The routine 200 then continues to operation 212, where the gesture recognition unit 150 outputs the generated control signal to the electronic device 50 via the communication interface 160. From operation 212, the routine 200 proceeds back to operation 202, as described above, where additional input may be processed in the manner described above.

If, at operation 206, the gesture recognition unit 150 determines that the pointer detection signal does not correspond to a gesture to control the electronic device 50, the routine 200 proceeds from operation 206 to operation 214. At operation 214, a determination is made as to whether the pointer detection signal corresponds to a gesture made on either the first touchpad 110A or the second touchpad 110B to change the mode on the other of the first touchpad 110A or the second touchpad 110B. For example, a user may make a gesture on the first touchpad 110A to change the mode of the second touchpad 110B from a mouse mode to a mode that supports arrow keys. In the arrow key mode, rather than dragging across the first or second touchpad 110A and 110B to move a cursor on a screen of the electronic device 50, the cursor may be moved using virtual areas on the first or second touchpad 110A and 110B that may be tapped (or tapped followed by a continuous pointing motion) in the manner that arrow keys may be pressed to move a cursor.

If, at operation 214, the gesture recognition unit 150 determines that the pointer detection signal does not correspond to a gesture made on either the first touchpad 110A or the second touchpad 110B to change the mode of operation of the other of the first touchpad 110A or the second touchpad 110B, the routine 200 proceeds from operation 214 to operation 202, as described above.

In some embodiments, if, at operation 206, the gesture recognition unit 150 determines that the pointer detection signal does not correspond to a gesture to control the electronic device 50, and, at operation 214, the pointer detection signal does not correspond to a gesture made on either the first touchpad 110A or the second touchpad 110B to change the mode of operation of the other of the first touchpad 110A or the second touchpad 110B, a visual, audible, or tactile signal (or a combination of signals) is output to alert the user to the fact that the contact made on the first touchpad 110A and/or second touchpad 110B is not recognized by the dual touchpad system 100. In some embodiments, the dual touchpad system 100 further comprises an output unit 170, which may include one or more of a light, such as an LED (light-emitting diode), a speaker, and an actuator, and the visual, audible, or tactile signal is output via the output unit 170.

If, at operation 214, the gesture recognition unit 150 determines that the pointer detection signal corresponds to a gesture made on either the first touchpad 110A or the second touchpad 110B to change the mode on the other of the first touchpad 110A or the second touchpad 110B, the routine 200 continues to operation 216, where the mode of the other of the first touchpad 110A or the second touchpad 110B is changed. From operation 216, the routine 200 proceeds to operation 202, as described above. It should be appreciated that, in this case, at operation 208, the determination of the gesture is made with reference to this changed mode of operation of the other of the first touchpad 110A or the second touchpad 110B.

Figure 3:
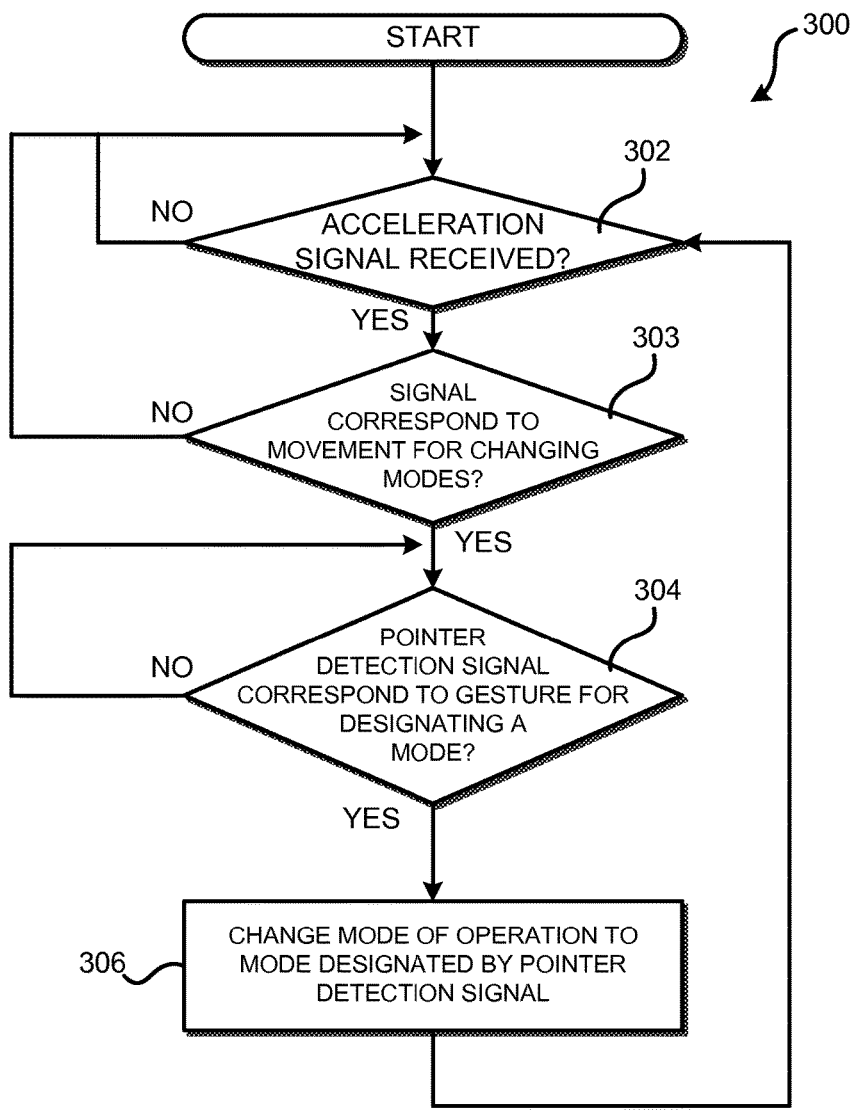
FIG. 3 is a flow diagram showing one illustrative routine for receiving input from an accelerometer and a touchpad in a dual touchpad system to change a mode of operation of a touchpad in the dual touchpad system, according to one embodiment presented herein.

Referring now to FIG. 3, a flow diagram will be described that shows a routine 300 that illustrates aspects of one mechanism of receiving input from an accelerometer 140 and a touchpad 110A and/or 110B in a dual touchpad system 100 to change the mode of operation of the dual touchpad system, according to one embodiment disclosed herein.

The routine 300 begins at operation 302, where the gesture recognition unit 150 determines whether it has received an acceleration signal from the accelerometer 140. If no acceleration signal has been received, the routine 300 proceeds back to operation 302, where another such determination is made. If an acceleration signal has been received, the routine 300 proceeds from operation 302 to operation 303.

At operation 303, the gesture recognition unit 150 determines whether it has received an acceleration signal from the accelerometer 140 that corresponds to movement of the dual touchpad system 100 indicating a desire to change a mode operation of the dual touchpad system 100. For example, a user may turn the dual touchpad system 100 upside down and right-side up. In response thereto, the gesture recognition unit 150 determines from the resulting acceleration signal transmitted by the accelerometer 140 that the user desires to change a mode of operation of the dual touchpad system 100. It should be appreciated that a user may perform any designated movement to realize such control, such as shaking the dual touchpad system 100, jerking the dual touchpad system 100 (for example, to the right or left, or up or down), etc.

If, at operation 303, the gesture recognition unit 150 determines that an acceleration signal has not been received from the accelerometer 140 that corresponds to movement of the dual touchpad system 100 indicating a desire to change modes of the dual touchpad system 100, the routine 300 returns back to operation 302, described above. If, at operation 303, an acceleration signal has been received from the accelerometer 140 that corresponds to movement of the dual touchpad system 100 indicating a desire to change modes of the dual touchpad system 100, the routine 300 continues from operation 303 to operation 304.

At operation 304, the gesture recognition unit 150 determines a pointer detection signal has been received from the input detection unit 130 that corresponds to a gesture made on either or both the first touchpad 110A and the second touchpad 110B, and in which the gesture corresponds to a command to change the dual touchpad system 100 into a particular mode of operation. If a pointer detection signal is not received that corresponds to a gesture made on either or both the first touchpad 110A and the second touchpad 110B and in which the gesture corresponds to a command to change the dual touchpad system 100 into a particular mode of operation, the routine 300 returns back to operation 304 for another such determination.

If, at operation 304, the gesture recognition unit 150 determines that a pointer detection signal has been received that corresponds to a gesture made on either or both the first touchpad 110A and the second touchpad 110B, and in which the gesture corresponds to a command to change the dual touchpad system 100 into a particular mode, the routine 300 continues to operation 306, where the mode of operation of the dual touchpad system 100 is changed on the basis of the command corresponding to the received pointer detection signal. From operation 306, the routine 300 returns to operation 302, as described above. It should be appreciated that, following the routine 300 of FIG. 3, should the routine 200 of FIG. 2 be initiated by user contact on either or both of the first and second touchpads 110A and 110B of operation 202, subsequently at operation 208, the determination of the gesture is made on the basis of this changed mode of operation of the dual touchpad system 100.

FIGS. 4A-4B are device diagrams showing several illustrative layouts for the touchpads 110A and 110B in a dual touchpad system 100 and their use, according to several embodiments disclosed herein. As shown in FIGS. 4A and 4B, the exterior of the dual touchpad system 100 may rectangular in some embodiments. The exterior of the dual touchpad system 100 might also be configured using other shapes in other implementations.

In some embodiments, the first and second touchpads 110A and 110B are square-shaped and have substantially the same outer dimensions. When held in a horizontal orientation, that is, in the orientation shown in FIG. 4A, the first and second touchpads 110A and 110B may be adjacent to each other in a horizontal direction with a space provided therebetween. When held in the vertical orientation, as shown in FIG. 4B, the first and second touchpads 110A and 110B are vertically spaced apart from each other. Since the first and second touchpads 110A and 110B are not disposed such that one touchpad 110A or 110B surrounds the other touchpad 110A or 110B, it may also be stated that first and second touchpads 110A and 110B are non-concentric.

With the configuration shown in FIG. 4A, the dual touchpad system 100 can be held in both hands when positioned horizontally, and the first and second touchpads 110A and 110B can be operated with the thumbs of the user. For example, the first touchpad 110A can be operated with the thumb on the left hand of the user and the second touchpad 110B can be operated with the thumb on the right hand of the user. When positioned vertically, as shown in FIG. 4B, the dual touchpad system 100 can be held in one hand and operated using one thumb.

There are many advantages to an arrangement of the touchpads 110A and 110B as shown in FIGS. 4A and 4B. For example, in contrast to conventional touchpad and button combinations, there is sufficient room in the configuration presented herein for a user's hands to move and to operate the first and second touchpads 110A and 110B. Moreover, a user can comfortably hold the dual touchpad system 100 and perform swiping motions with his or her thumbs to quickly and easily realize various control of the electronic device 50. Again, this may be contrasted this with the somewhat awkward manipulation involved using the conventional touchpad and button combination, in which the user may operate the touchpad using an index finger on one hand and operate the buttons using the index finger on the other hand.

In some embodiments, the dual touchpad system 100 is embedded in the electronic device 50 and is therefore a part of the electronic device 50. For example, the electronic device 50 may be a laptop computer and the dual touchpad system 100 may be embedded in the laptop computer, for example, to one side of or below the keyboard of the laptop computer. As another example, the electronic device 50 may be a handheld game console, and the dual touchpad system 100 may be embedded in the casing of the handheld game console or a game controller. It should be appreciated that, in such embodiments, the gesture recognition unit 150 could be disposed in the electronic device 50, or could be realized by operation of a processor of the electronic device 50. Moreover, the communication interface 160 may be omitted from such a configuration.

Finally, in some embodiments, the output unit 170 may be a part of the electronic device 50. In this case, the gesture recognition unit 150 may output a visual, audible, or tactile signal (or a combination of these signals) via the output unit 170 to indicate completion of various control by the gesture recognition unit 150. For example, the gesture recognition unit 150 may output at least one of a visual signal, an audible signal, and a tactile signal via the output unit 170 after the mode of the other of the first touchpad 110A or the second touchpad 110B has been changed in response to determining that pointer detection signals correspond to gestures made on the first touchpad 110A or the second touchpad 110B to change the mode of operation of the other of the first touchpad 110A or the second touchpad 110B.

Based on the foregoing, it should be appreciated that technologies have been described herein for implementing a dual touchpad system. Although the embodiments described herein have been described in language specific to hardware structural features and methodological acts, it is to be understood that the invention defined in the appended claims is not necessarily limited to the specific structures, acts or media described. Therefore, the specific structural features, acts and mediums are disclosed as exemplary embodiments implementing the claimed invention.

What is claimed is:

1. A computer-implemented method for controlling an electronic device using a dual touchpad system, the method comprising:
generating a first pointer detection signal in response to detecting contact and any movement or breaking thereof on a first touchpad in the dual touchpad system;
in response to determining that the first pointer detection signal corresponds to a gesture made on the first touchpad to change a mode of operation of a second touchpad,
changing the mode of operation of the second touchpad from a first mode of operation to a second mode of operation with reference to the gesture corresponding to the first pointer detection signal, and
maintaining a mode of operation of the first touchpad
subsequent to changing the mode of operation of the second touchpad, generating a second pointer detection signal in response to detecting contact and any movement or breaking thereof on the second touchpad;
in response to determining that the second pointer detection signal corresponds to a gesture made on the second touchpad to control the electronic device, generating a control signal with reference to the gesture corresponding to the second pointer detection signal and with reference to the second mode of operation of the second touchpad; and
outputting the control signal to the electronic device.

2. The computer-implemented method of claim 1, wherein the control signal is output to the electronic device wirelessly via a wireless interface of the dual touchpad system.

3. The computer-implemented method of claim 1, further comprising, in response to determining that the first pointer detection signal does not correspond to the gesture made on the first touchpad to change the mode of operation of the second touchpad or to a gesture to control the electronic device, outputting at least one of a visual signal to a light, an audible signal, or a tactile signal via an output unit of the dual touchpad system.

4. A dual touchpad system, comprising:
  a first touchpad and a second touchpad, wherein the first touchpad is spaced apart from and is non-concentric with the second touchpad;
  an input detection unit coupled to the first and second touchpads and configured to monitor the first and second touchpads for contact thereon and generate a first pointer detection signal in response to detecting contact and any movement or breaking thereof on either the first touchpad or the second touchpad;
  a gesture recognition unit configured to control the dual touchpad system in response to receiving input from the input detection unit indicative of contact on the first touchpad to control the dual touchpad system, and in response to determining that the first pointer detection signal corresponds to a gesture made on the first touchpad to change a mode of operation of the second touchpad, change the mode of operation of the second touchpad from a first mode of operation to a second mode of operation with reference to the gesture corresponding to the first pointer detection signal while maintaining a mode of operation of the first touchpad;
  subsequent to changing the mode of operation of the second touchpad, generate a second pointer detection signal in response to detecting contact and any movement or breaking thereof on the second touchpad;
  in response to determining that the second pointer detection signal corresponds to a gesture made on the second touchpad to control the dual touchpad system, generate a control signal with reference to the gesture corresponding to the second pointer detection signal and with reference to the second mode of operation of the second touchpad; and
  output the control signal to the dual touchpad system.

5. The dual touchpad system of claim 4, further comprising a wired interface coupled to the gesture recognition unit, wherein the gesture recognition unit is configured to output the control signal to the dual touchpad system via the wired interface and a cable.

6. The dual touchpad system of claim 5, further comprising an output unit including at least one of a light, a speaker, and an actuator, and wherein the gesture recognition unit is further configured to, in response to determining that the first pointer detection signal does not correspond to the gesture made on the first touchpad to change the mode of operation of the second touchpad or to a gesture to control the dual touchpad system, output at least one of a visual signal, an audible signal, and a tactile signal via the output unit.

7. The method of claim 1, where, in the first mode of operation, an on-screen cursor is controlled when contact with the second touchpad followed by a dragging movement is detected, and in the second mode of operation, the on-screen cursor is controlled when tapping is detected on the second touchpad.

8. The dual touchpad system of claim 4, where, in the first mode of operation, an on-screen cursor is controlled when contact with the second touchpad followed by a dragging movement is detected, and in the second mode of operation, the on-screen cursor is controlled when tapping is detected on the second touchpad.

9. The dual touchpad system of claim 4, wherein the gesture recognition unit is further configured to:
  receive input from an accelerometer, the input from the accelerometer comprising accelerometer signals;
  in response to receiving the input from the accelerometer, determining an orientation of the dual touchpad system; and
  interpreting the first pointer detection signal and the second pointer detection signal based upon the orientation of the dual touchpad system.

10. The dual touchpad system of claim 4, wherein the gesture recognition unit is further configured to:
  in response to determining that the first pointer detection signal does not correspond to the gesture made on the first touchpad to change the mode of operation of the second touchpad,
    control the movement of a mouse cursor in response to determining that the first pointer detection signal corresponds to the gesture made on the first touchpad, or
    control scrolling in response to determining that the first pointer detection signal corresponds to the gesture made on the second touchpad.

11. The computer-implemented method of claim 1, further comprising:
  in response to determining that the first pointer detection signal does not correspond to the gesture made on the first touchpad to change the mode of operation of the second touchpad,
    control the movement of a mouse cursor in response to determining that the first pointer detection signal corresponds to the gesture made on the first touchpad, or
    control scrolling in response to determining that the first pointer detection signal corresponds to the gesture made on the second touchpad.

12. The computer-implemented method of claim 1, further comprising in response to determining that the first pointer detection signal does not correspond to a gesture for controlling the electronic device, outputting an error message to the electronic device.

* * * * *